US008005172B2

(12) United States Patent
Jang

(10) Patent No.: US 8,005,172 B2
(45) Date of Patent: Aug. 23, 2011

(54) ACQUISITION APPARATUS AND METHOD

(75) Inventor: Kyungwoon Jang, Yokohama (JP)

(73) Assignee: Kabushiki Kaisha Toshiba, Tokyo (JP)

(*) Notice: Subject to any disclaimer, the term of this patent is extended or adjusted under 35 U.S.C. 154(b) by 868 days.

(21) Appl. No.: 11/863,813

(22) Filed: Sep. 28, 2007

(65) Prior Publication Data

US 2008/0181346 A1 Jul. 31, 2008

(30) Foreign Application Priority Data

Sep. 29, 2006 (JP) ............... P2006-269612

(51) Int. Cl.
*H04L 27/06* (2006.01)
(52) U.S. Cl. ........ 375/343; 375/342; 375/341; 375/340; 375/316; 375/254; 714/12
(58) Field of Classification Search ................ 375/343
See application file for complete search history.

(56) References Cited

U.S. PATENT DOCUMENTS

| | | | | |
|---|---|---|---|---|
| 4,550,414 A * | 10/1985 | Guinon et al. | ................. | 375/150 |
| 5,329,546 A * | 7/1994 | Lee | ................. | 370/342 |
| 5,642,377 A * | 6/1997 | Chung et al. | ................. | 375/145 |
| 6,144,691 A * | 11/2000 | Kenney | ................. | 375/130 |
| 6,185,245 B1 * | 2/2001 | Kim | ................. | 375/149 |
| 6,493,334 B1 * | 12/2002 | Krzymien et al. | ............ | 370/342 |
| 6,493,360 B1 | 12/2002 | Nishimura | | |
| 6,519,277 B2 * | 2/2003 | Eidson | ................. | 375/150 |
| 6,714,785 B1 * | 3/2004 | Han | ................. | 455/440 |
| 6,807,223 B2 * | 10/2004 | Katz et al. | ................. | 375/149 |
| 6,810,072 B1 * | 10/2004 | Akopian | ................. | 375/143 |
| 6,901,106 B1 * | 5/2005 | Chen et al. | ................. | 375/150 |
| 6,912,227 B1 * | 6/2005 | Chang et al. | ................. | 370/441 |
| 6,931,055 B1 * | 8/2005 | Underbrink et al. | ......... | 375/150 |
| 6,965,632 B2 * | 11/2005 | Kimura et al. | ................. | 375/142 |
| 7,072,618 B1 * | 7/2006 | Strutt | ................. | 455/67.13 |

(Continued)

FOREIGN PATENT DOCUMENTS

JP 07-202753 8/1995

(Continued)

OTHER PUBLICATIONS

Polydoros et al, A Unified Approach to Serial Search Spread-Spectrum Code Acquisition Part I: General Theory, IEEE Transactions on Communications, May 1984, vol. Com 32, No. 5.

(Continued)

*Primary Examiner* — Chieh M Fan
*Assistant Examiner* — Santiago Garcia
(74) *Attorney, Agent, or Firm* — Turocy & Watson, LLP

(57) ABSTRACT

An acquisition apparatus includes: a first phase-calculating section that calculates a first correlation value by performing correlating operation of a reception signal and a reference signal and determines whether or not the first correlation value is equal to or greater than a first threshold; a threshold calculating section that calculates a second threshold by performing averaging operation of the first correlation value and the first threshold when the first correlation value is equal to or greater than the first threshold; and a second phase-calculating section that calculates a second correlation value by performing correlating operation of the reception signal and the reference signal on a basis of a phase of the reference signal which realizes the first correlation value equal to or greater than the first threshold, and determines whether or not the second correlation value is equal to or greater than the second threshold.

8 Claims, 6 Drawing Sheets

U.S. PATENT DOCUMENTS

| | | | |
|---|---|---|---|
| 7,227,887 B2 * | 6/2007 | Yoon | 375/150 |
| 7,272,124 B1 * | 9/2007 | Horne et al. | 370/335 |
| 7,362,732 B2 * | 4/2008 | Yamada | 370/335 |
| 7,545,854 B1 * | 6/2009 | Gronemeyer | 375/152 |
| 2003/0039221 A1 * | 2/2003 | Yamada | 370/320 |
| 2008/0181346 A1 * | 7/2008 | Jang | 375/359 |

FOREIGN PATENT DOCUMENTS

| | | |
|---|---|---|
| JP | 2001-251216 | 9/2001 |
| JP | 2002-165274 | 6/2002 |
| JP | 2003-283378 | 10/2003 |

OTHER PUBLICATIONS

Japanese Office Action for Application No. 2006-269612 mailed on Mar. 15, 2011.

* cited by examiner

ACQUISITION APPARATUS AND METHOD

CROSS-REFERENCE TO RELATED APPLICATIONS

This application is based upon and claims the benefit of priority from Japanese Patent Application No. 2006-269612, filed Sep. 29, 2006, the entire contents of which are incorporated herein by reference.

BACKGROUND OF THE INVENTION

One embodiment of the invention relates to an acquisition apparatus and method for use in a mobile communication system using a direct-sequence code division multiple access (DS-CDMA) scheme.

In CDMA mobile communications, acquisition is the most basic function first required prior to a start of communications. Because acquisition requires a time constituting an overhead of communications, the speed increase thereof is important.

Acquisition is a method of establishing a synchronization by generating spreading codes (reference signals) in predetermined timing at a mobile station and matching those to the timing of spreading codes of from the base station while deviating the timing thereof. Specifically, by performing correlating operation while sequentially changing the phase of the spreading codes by use of the same spreading codes as used at the transmission side, the correlation value obtained by correlating operation is compared with a threshold so that synchronization can be established with the transmission side by utilization of the comparison result (see Non-patent Document A. Polydoros and C. L. Weber, "A unified approach to serial search spread-spectrum code acquisition—Part 1: General Theory," IEEE Trans. Com., for example). The threshold, for comparison with the correlation value, is usually established by adjusting the accurate channel estimation value calculated from a reception signal.

Meanwhile, there is proposed an approach of controlling the threshold by calculating the mean power over reception signals and performing arithmetic operation on the calculated mean powers as an art to adapt the threshold, for comparison with a correlation value, to communication environment (see Patent Document JP-A-2001-2512161).

However, in acquisition, correlating operation and comparison with a threshold are repeated a plurality of times. Each time complicated operation is executed, operation amount increases significantly thus increasing the data processing amount and hardware scale.

SUMMARY OF THE INVENTION

According to an aspect of the present intention, there is provided an acquisition apparatus includes: a first phase-calculating section that calculates a first correlation value by performing correlating operation of a reception signal and a reference signal and determines whether or not the first correlation value is equal to or greater than a first threshold; a threshold calculating section that calculates a second threshold by performing averaging operation of the first correlation value and the first threshold when the first correlation value is equal to or greater than the first threshold; and a second phase-calculating section that calculates a second correlation value by performing correlating operation of the reception signal and the reference signal on a basis of a phase of the reference signal which realizes the first correlation value equal to or greater than the first threshold, and determines whether or not the second correlation value is equal to or greater than the second threshold.

According to another embodiment of the present invention, there is provided an acquisition method includes: calculating a first correlation value by performing correlating operation of a reception signal and a reference signal; determining whether or not the first correlation value is equal to or greater than a first threshold; calculating a second threshold by performing averaging operation of the first correlation value and the first threshold when the first correlation value is equal to or greater than the first threshold; and calculating a second correlation value by performing correlating operation of the reception signal and the reference signal on a basis of a phase of the reference signal which realizes the first correlation value equal to or greater than the first threshold; and determining whether or not the second correlation value is equal to or greater than the second threshold.

BRIEF DESCRIPTION OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION OF THE PREFERRED EMBODIMENTS

Figure 1:
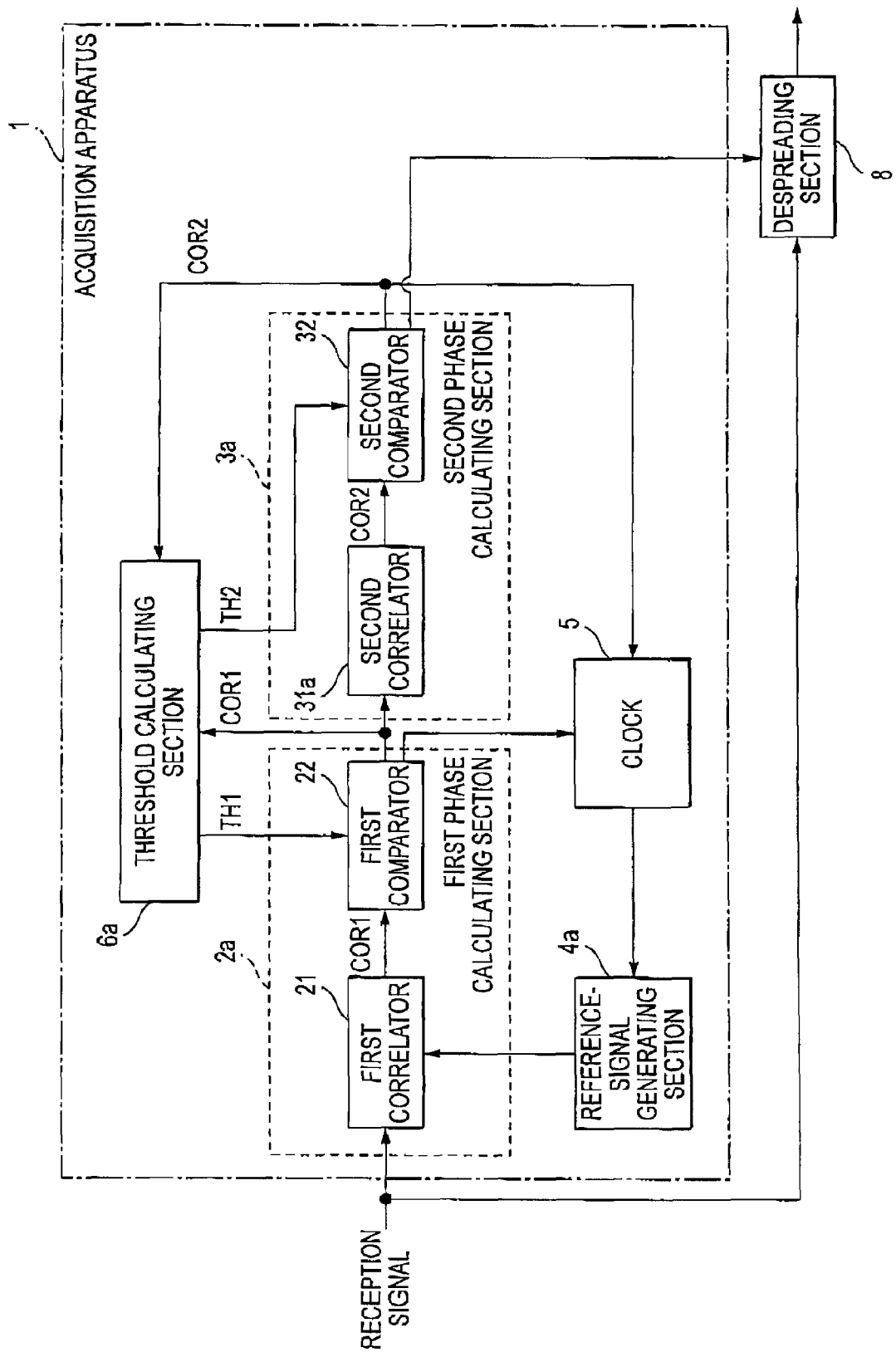
FIG. 1 is an exemplary block diagram showing a configuration example of an acquisition apparatus according to a first embodiment of the present invention.

With reference to the drawings, explanation will be now made on the first and second embodiments according to the invention. In describing the figures of the first and second embodiment, identical or similar element is attached with identical or similar reference numerals.

First Embodiment

The following embodiment explains an acquisition apparatus to be applied to a CDMA mobile communication system. An acquisition apparatus 1, in a first embodiment of the invention, is to be used together with a despreading section 8, and includes a reference-signal generating section 4a, a first phase-calculating section 2a, a threshold calculating section 6a, a clock generating section 5 and a second phase-calculating section 3a, as shown in FIG. 1.

The acquisition apparatus 1, shown in FIG. 1, is to be mounted on a mobile communication terminal so that it can input therein a reception signal sent from a base station through a radio-frequency (RF) section, not shown. The RF section is to perform amplification, down-conversion and band-limitation on the reception signal delivered from an antenna.

The reference signal generating section 4a is to generate a spreading code as a reference signal for comparison with the reception signal, based on a clock generated by the clock generating section 5. The spreading code utilizes, say, a PN code or a Gold code.

The first phase-calculating section 2a is provided to roughly determine an agreement between the reception signal and the reference signal while the second phase-calculating section 3a is provided to exactly determine an agreement between the reception signal and the reference signal. For agreement determination, a first threshold TH1 is set up in the first phase-calculating section 2a while a second threshold TH2 is set up in the second phase-calculating section 3a.

The first phase-calculating section 2a is to determine a first correlation value COR1 by performing correlating operation of the reception signal and the reference signal, and determines whether the first correlation value COR1 is equal to or greater than the first threshold TH1. Specifically, the first phase-calculating section 2a has a first correlator 21 that calculates a first correlation value COR1 and a first comparator 21 that compares the first correlation value COR1 with the first threshold TH1 and determines whether or not the first correlation value COR1 is equal to or greater than the first threshold TH1.

The first correlator 21 is to obtain a correlation value by serial search. Namely, the first correlator 21 is to calculate a correlation value to the reference signal, as a first correlation value COR1, at an interval of 1/M (M: integer equal to or greater than 1) chip over the entire search range of acquisition of the reception signal.

Figure 2:
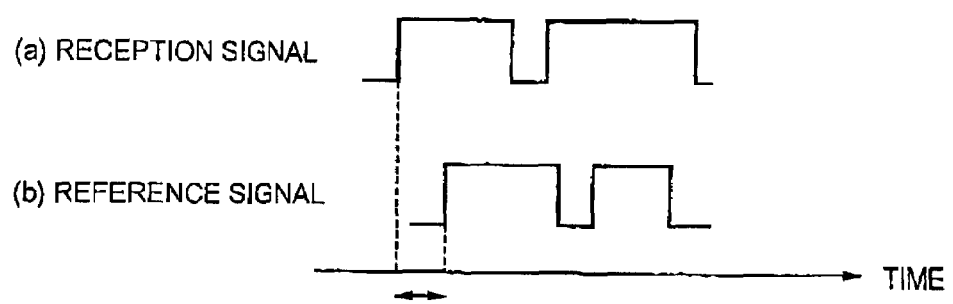
FIG. 2 is an exemplary waveform diagram explaining the operation of the acquisition apparatus according to the first embodiment of the invention.
Figure 3:
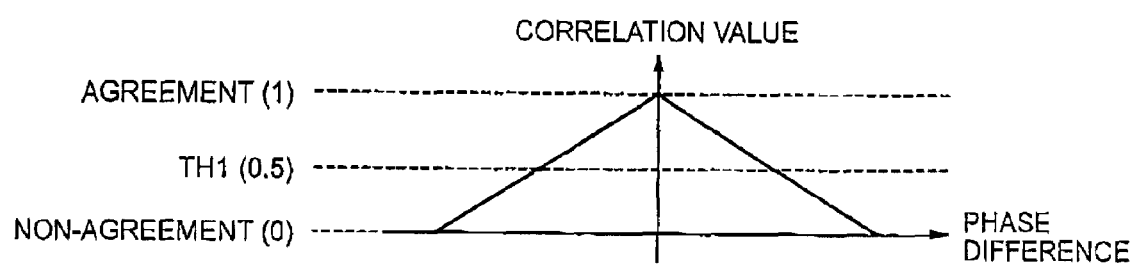
FIG. 3 is an exemplary characteristic figure explaining the operation of the acquisition apparatus according to the first embodiment of the invention.

As shown in FIGS. 2 and 3, when the reception signal and the reference signal have a great phase difference, the first correlation value COR1 is given as a small value (e.g. 0). When the reception signal and the reference signal are in phase with each other, the first correlation value COR1 is given as a great value (e.g. 1).

However, where reception quality is deteriorated, the correlation value is calculated low even in case the reception signal and the reference signal are in phase with each other. For this reason, the first threshold TH1 may be maintained great where reception quality is favorable whereas the first threshold TH1 is required provided at a somewhat low value where reception quality is deteriorated. Incidentally, the first threshold TH1 and the second threshold TH2 have respective initial values set at 0.5, for example.

When the first correlation value COR1 is equal to or greater than the first threshold TH1, the threshold calculating section 6a calculates a second threshold TH2 by performing averaging operation of the first correlation value COR1 and the first threshold TH1. Namely, provided that the first correlation value is "COR1" and the first threshold is "TH1", the second threshold "TH2" is calculated by:

$$TH2=(COR1+TH1)/2 \quad (1)$$

On the contrary, when the first correlation value COR1 is smaller than the first threshold TH1, the threshold calculating section 6a adjust the clock which the clock generating section 5 generates.

Accordingly, where reception quality is favorable, determination is made available with greater exactness by increasing the second threshold TH2.

The second phase-calculating section 3a is to determine a second correlation value by performing correlating operation of the reception signal and the reference signal on the basis of the phase of the reference signal which the first correlation value COR1 equal to or greater than the first threshold TH1 has been obtained, thus determining whether or not the second correlation value COR2 is equal to or greater than the second threshold TH2.

Specifically, the second phase-calculating section 3a has a second correlator 31a that calculates a second correlation value COR2 and a second comparator 32 that compares the second correlation value COR2 with the second threshold TH2 and determines whether or not the second correlation value COR2 is equal to or greater than the second threshold TH2. The second correlator 31a is to calculate a second correlation value COR2 in the range, say, of a 1/(2M) chip, as to the phase of the reference signal which the first correlation value COR1 equal to or greater than the first threshold TH1 has been obtained.

When the second correlation value COR2 is equal to or greater than the second threshold TH2, the relevant phase is outputted as the final phase. On the contrary, when the second correlation value COR2 is smaller than the second threshold TH2, the threshold calculating section 6a performs averaging operation of the second correlation value COR2 and the second threshold TH2 thereby calculating a first threshold TH1. Namely, provided that the second correlation value is "COR21" and the second threshold is "TH2", the first threshold "TH1" is calculated by:

$$TH1=(COR2+TH2)/2 \quad (2)$$

Accordingly, where reception quality is deteriorated, the first threshold TH1 is decreased. Incidentally, when the second correlation value COR2 is smaller than the second threshold TH2, false alert is considered occurred and penalty time is added, and then the process returns to the first phase-calculating section 2a.

The phase of the reference signal, which the second correlation value COR2 equal to or greater than the second threshold TH2 has been obtained, is supplied as the final phase to the despreading section 8. In this manner, the phase information (timing information) obtained by acquisition is supplied to the despreading section 8. The despreading section 8 despreads the reception signal by use of the phase information (timing information) obtained by acquisition.

Figure 4:
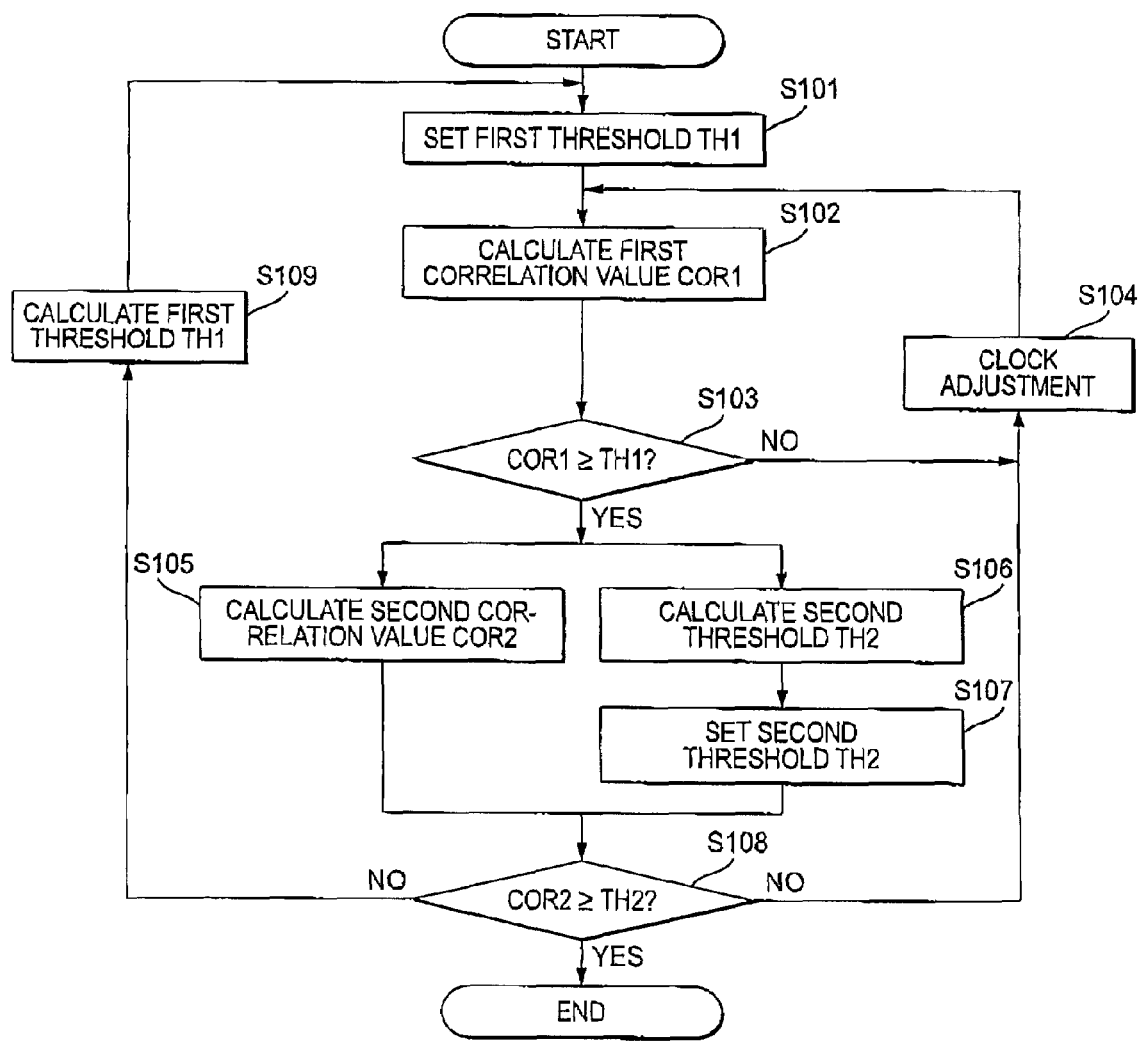
FIG. 4 is an exemplary flowchart showing an example of an acquisition method according to the first embodiment of the invention.

With reference to a flowchart shown in FIG. 4, explanation is now made on an acquisition method according to the first embodiment.

At step S101, the threshold calculating section 6a sets the first comparator 22 with a first threshold TH1 (initial value).

At step S102, the first correlator 21 performs correlating operation of the reception signal and the reference signal thereby obtaining a first correlation value COR1.

At step S103, the first correlator 22 compares between the first correlation value COR1 and the first threshold TH1 and determines whether or not the first correlation value COR1 is equal to or greater than the first threshold TH1. When the first correlation value COR1 is determined equal to or greater than the first threshold TH1, the process moves to steps S105 and S106. When the first correlation value COR1 is determined smaller than the first threshold TH1, the process moves to step S104.

At step S104, adjustment is made on the clock the clock generating section 5 generates.

At step S105, the second correlator 31a calculates a second correlation value COR2 in the range, say, of 1/(2M) chip, as to the phase of the reference signal which the first correlation value COR1 equal to or greater than the first threshold TH1 has been obtained.

At step S106, the threshold calculating section 6a calculates a second threshold TH2 according to equation (1).

At step S107, the threshold calculating section 6a sets the second comparator 32 with the second threshold TH2 calculated at the step S106.

At step S108, the second comparator 32 compares the second correlation value COR2 with the second threshold TH2 and determines whether or not the second correlation value COR2 is equal to or greater than the second threshold TH2. When the second correlation value COR2 is determined equal to or greater than the second threshold TH2, the final phase is determined. When the second correlation value COR2 is determined smaller than the second threshold TH2, the process moves to steps S104 and S106.

At step S109, the threshold calculating section 6a calculates a first threshold TH1 according to equation (1). The calculated first threshold TH1 is set to the first comparator 22 at step S101.

As described in detail above, according to the first embodiment, the threshold for use in acquisition can be suitably determined by simple operation. Accordingly, data processing amount can be diminished and acquisition be implemented at high speed. Besides, hardware scale can be reduced.

Second Embodiment

Figure 5:
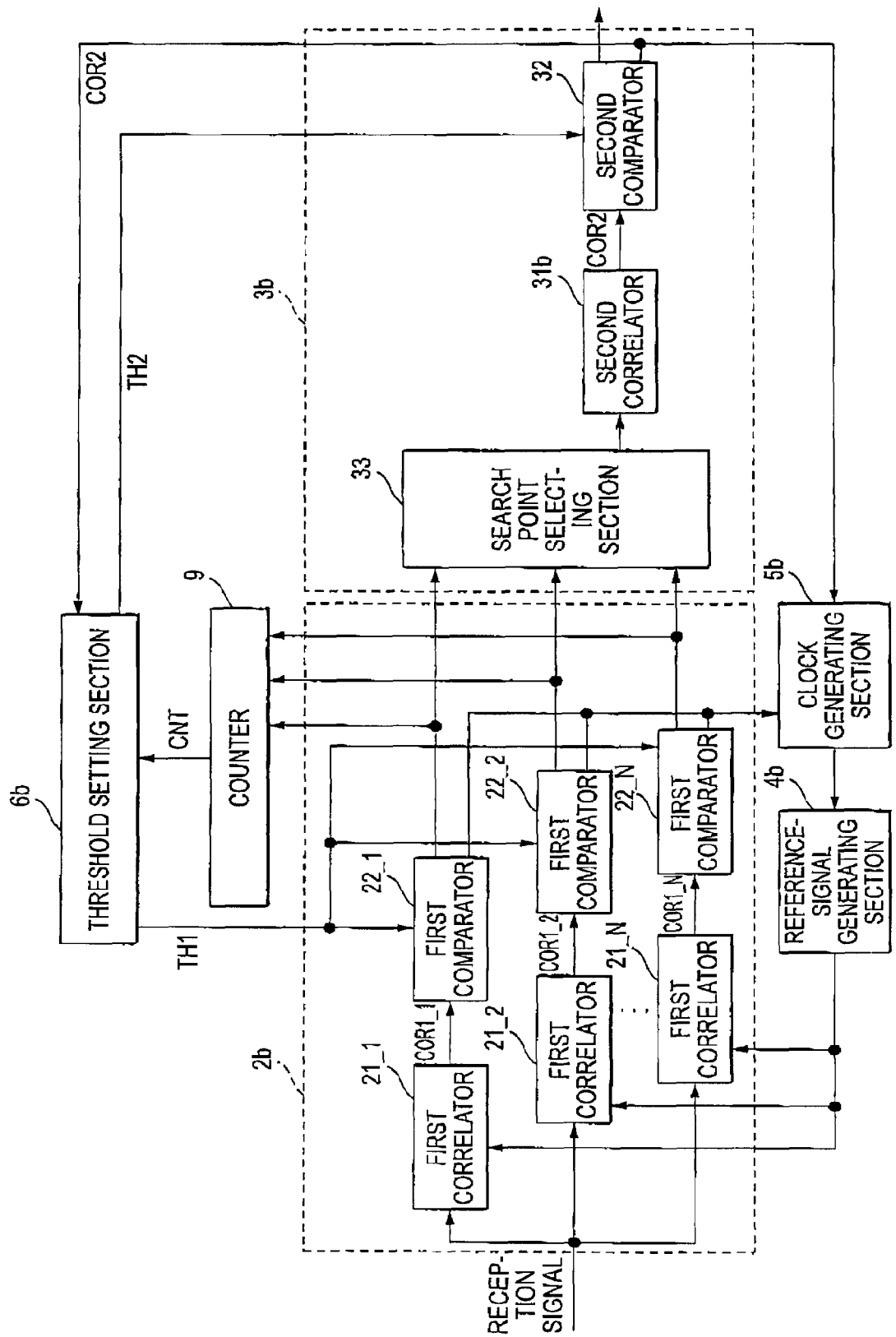
FIG. 5 is an exemplary block diagram showing a configuration example of an acquisition apparatus according to a second embodiment of the invention.

The first embodiment explained the case the first phase-calculating section 2a executes serial search. The second embodiment explains a case that the first phase-calculating section 2b performs parallel search, as shown in FIG. 5. Parallel search refers to a technique that a reference-signal generating section 4b generates a plurality of systems of spreading codes (reference signals) mutually different, say, by a half or quarter period of the spread code (reference signal) and detects a synchronization point concurrently by use of the spread codes (reference signals).

Figure 6:
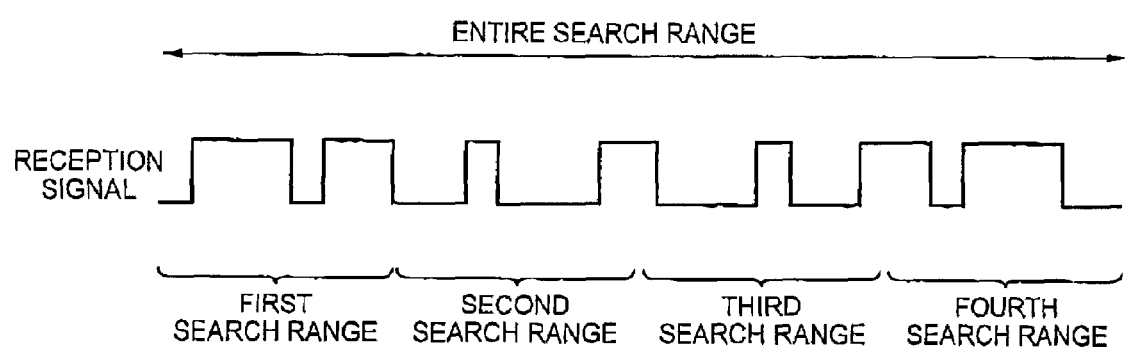
FIG. 6 is an exemplary waveform diagram explaining the operation of the acquisition apparatus according to the second embodiment of the invention.

In the example shown in FIG. 6, the reference-signal generating section 4b generates four systems of reference signals mutually different by a quarter period of the reference signal and detects a synchronization point by segmenting the entire search range as first to fourth search ranges.

A first phase-calculating section 2b, shown in FIG. 5, has first correlators 21_1-21_N in the number of N ($N \geq 2$) and first comparators 22_1-22_N in the number of N. The first correlators 21_1-21_N calculate first correlation values COR1 of reception and reference signals by deviating the phase of the reference signal at an interval of 1/M chip, in respective search ranges.

The first comparators 22_1-22_N each compare between the first correlation value COR1_1-COR1_N calculated from the first correlator 21_1-21_N and the first threshold TH1 of from the threshold calculating section 6b and calculates a phase of the first correlation value COR1_1-COR1_N equal to or greater than the first threshold TH1.

A counter 9 is to count the number of the first correlation values COR1_1-COR_N that are equal to or greater than the first threshold TH1. A threshold calculating section 6b performs averaging operation of the first correlation value COR, equal to or greater than the first threshold TH1, and the first threshold TH1 by use of the count result CNT of the counter 9, thereby calculating a second threshold TH2.

Explanation is herein made on an example that N is 4. In the case that only the first correlation value COR_1, out of the first correlation values COR_1-COR_4, exceeds the first threshold TH1, the count result CNT is provided "1". The second threshold TH2 is calculated by;

$$TH2 = (COR1a + TH1)/(CNT + 1) \quad (3)$$
$$= (COR1a + TH1)/2.$$

On the contrary, when all the first correlation values COR_1-COR_4 exceed the first threshold TH1, the count result CNT is provided "4". The second threshold TH2 is calculated by:

$$TH2 = (COR1a + COR1b + COR1c + COR1d + \quad (4)$$
$$TH1)/(CNT+1)$$
$$= (COR1a + COR1b + COR1c + COR1d +$$
$$TH1)/5.$$

A search point selecting section 33 selects the phase (search point) of a maximum correlation value out of the first correlation values COR_1-1_N that are equal to or greater than the first threshold TH1.

A second correlator 31b calculates a second correlation value COR2 for the phase of the maximum correlation value of the first correlation values COR1_1-COR1_N that are equal to or greater than the first threshold TH1, in a range of a 1/2M chip. A second comparator 32 compares the second correlation value COR2 with the second threshold TH2 and selects a final phase. The structure other than the above is similar to FIG. 1 and omitted of duplicated explanations.

Figure 7:
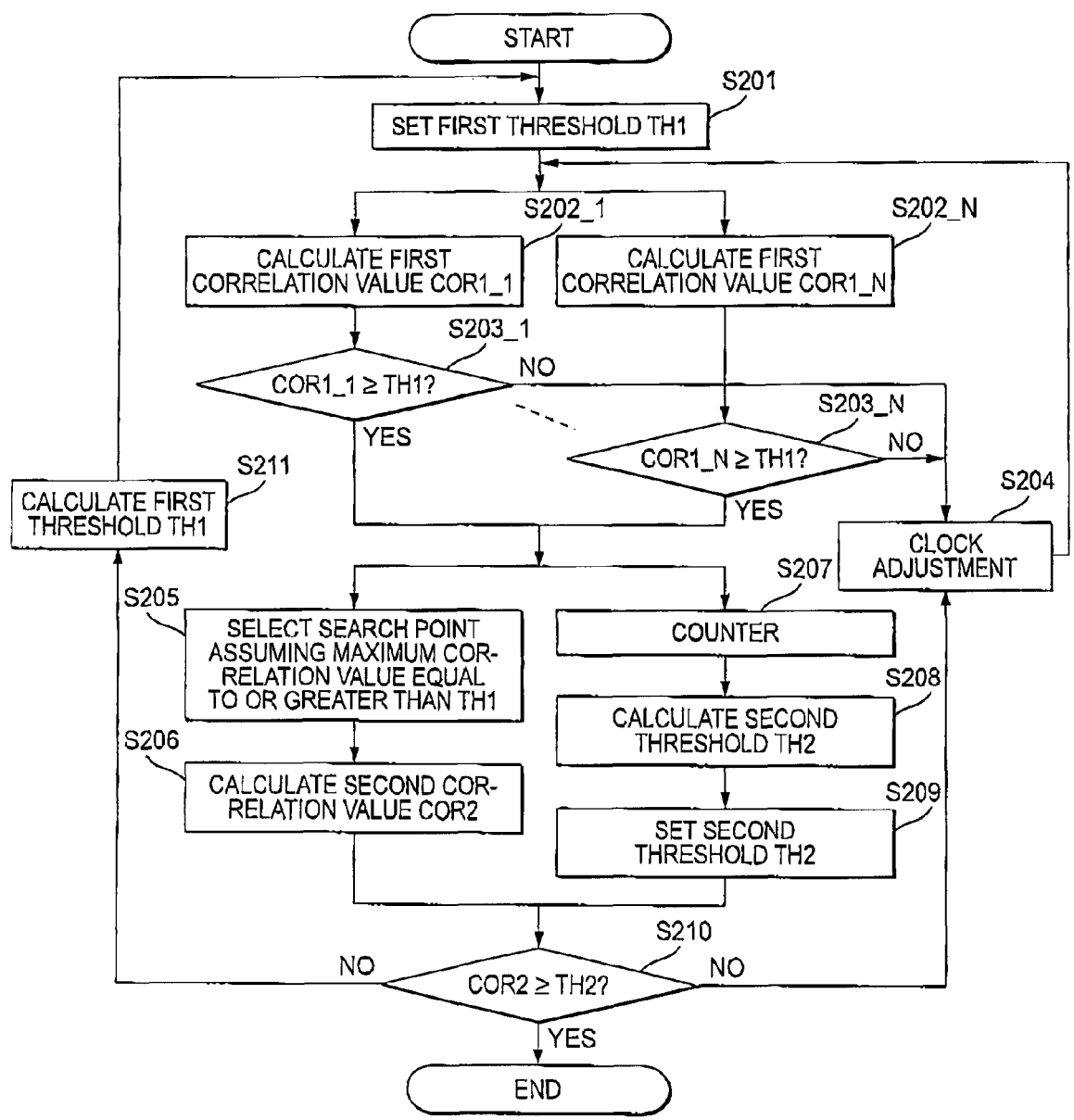
FIG. 7 is an exemplary flowchart showing an example of an acquisition method according to the second embodiment of the invention.

With reference to a flowchart shown in FIG. 7, explanation is made on an acquisition method according to the second embodiment.

At step S201, the threshold calculating section 6b sets a first threshold TH1 (initial value) to the first comparators 22_1-22_N.

At step S202_1-S202_N, the first correlators 21_1-21_N calculate first correlation values COR_1-COR_N.

At step S203_1-S203_N, the first comparators 22_1-22_N compare the first correlation values COR_1-COR_N calculated at the step S202_1-S202_N with the first threshold TH1. When the first correlation value COR_1-COR_N is equal to or greater than the first threshold TH1, the process moves to the steps S205 and S207. Meanwhile, when the first correlation value COR_1-COR_N is smaller than the first threshold TH1, the process moves to step S204.

At step S204, adjustment is made on the clock the clock generating section 5 generates.

At step S205, the search-point selecting section 33 selects the phase (search point) of the maximum correlation value out of the first correlation values COR_1-COR_N that are equal to or greater than the first threshold TH1.

At step S206, the second correlator 31b calculates a second correlation value COR2 for the phase (search point) of the maximum correlation value of the first correlation values COR1_1-COR1_N that are equal to or greater than the first threshold TH1, in a range of a 1/2M chip.

Meanwhile, at step S207, the counter 9 counts the number of the first correlation values COR_1-COR_N that are equal to or greater than the first threshold TH1.

At step S208, the threshold calculating section 6b performs averaging operation of the first correlation values COR1_1-COR1_N equal to or greater than the first threshold TH1 and the first threshold TH1 by use of the count result CNT of the counter 9, thereby calculating a second threshold TH2.

At step S209, the threshold calculating section 6b set the second threshold TH2, calculated at the step S208, to the second comparator 32.

At step S210, the second comparator 32 compares the second correlation value, calculated at the step S206, with the second threshold TH2 set at the step S209, and determines whether or not the second correlation value COR2 is equal to or greater than the second threshold TH2. When the second correlation value COR2 is determined equal to or greater than the second threshold TH2, the final phase is determined. When the second correlation value COR2 is determined smaller than the second threshold TH2, the process moves to the steps S204 and S211.

At step S211, the threshold calculating section 6b calculates a first threshold TH1. The calculated first threshold TH1, at step s201, is set to the first comparators 22_1-22_N.

In this manner, the second embodiment can suitably determine, by simple operation, a threshold for use in acquisition in accordance with the communication environment even where executing parallel search. Furthermore, because parallel search can detect a synchronization point at a faster speed than serial search, acquisition can be effected at higher speed than the first embodiment.

Other Embodiments

Although the invention was described on the first and second embodiment as in the above, the discussions and drawings forming a part of the disclosure should not be understood to limit the invention. From the disclosure, various alternative embodiments, examples and operation arts will become apparent for the person ordinarily skilled in the art.

For example, although the foregoing embodiment explained the acquisition apparatus to be applied to a CDMA mobile communication system, application is possible without limited to such a mobile communication system provided that the communication system is to conduct spread spectrum.

In this manner, the invention should be understood involving various embodiments, etc. not described herein. Therefore, the invention is to be limited only by the inventive matters of the claims reasonable from the disclosure.

As described with reference to the embodiment, there is provided an acquisition apparatus and method capable of adapting the threshold, for comparison with a correlation value, to communication environment and reducing data processing amount.

What is claimed is:

1. An acquisition apparatus comprising:
    a first phase-calculating section that includes a first correlator that calculates a first correlation value by performing correlating operation of a reception signal and a reference signal and determines whether or not the first correlation value is equal to or greater than a first threshold;
    a threshold calculating section that calculates a second threshold by performing averaging operation of the first correlation value and the first threshold when the first correlation value is equal to or greater than the first threshold; and
    a second phase-calculating section that includes a second correlator that calculates a second correlation value by performing correlating operation of the reception signal and the reference signal on a basis of a phase of the reference signal which realizes the first correlation value equal to or greater than the first threshold, and determines whether or not the second correlation value is equal to or greater than the second threshold,
    wherein the threshold calculating section calculates the first threshold by performing an averaging operation of the second correlation value and the second threshold value when the second correlation value is smaller than the second threshold.

2. The acquisition apparatus according to claim 1, wherein the first phase-calculating section has:
    a first correlator that calculates the first correlation value; and
    a first comparator that compares the first correlation value with the first threshold and determines whether or not the first correlation value is equal to or greater than the first threshold, and
    the second phase-calculating section has:
    a second correlator that calculates the second correlation value; and
    a second comparator that compares the second correlation value with the second threshold and determines whether or not the second correlation value is equal to or greater than the second threshold.

3. The acquisition apparatus according to claim 1, wherein the first phase-calculating section simultaneously performs a plurality of correlating operations by the use of reference signals that are different in phase from each other to calculate a plurality of first correlation value, and
    wherein the threshold calculating section calculating the second threshold by selecting at least one of the plurality of first correlation values which is equal to or greater than the first threshold and performing averaging operation of the at least one of the plurality of first correlation values and the first thresholds.

4. An acquisition method comprising:
    calculating a first correlation value by performing correlating operation of a reception signal and a reference signal;
    determining whether or not the first correlation value is equal to or greater than a first threshold;
    calculating a second threshold by performing averaging operation of the first correlation value and the first threshold when the first correlation value is equal to or greater than the first threshold;
    calculating a second correlation value in a processor by performing correlating operation of the reception signal and the reference signal on a basis of a phase of the reference signal which realizes the first correlation value equal to or greater than the first threshold;
    determining whether or not the second correlation value is equal to or greater than the second threshold; and
    calculating the first threshold by performing an averaging operation of the second correlation value and the second threshold value when the second correlation value is smaller than the second threshold.

5. The acquisition apparatus according to claim 1, further comprising:
    a clock generator that generate clock signal; and
    a reference signal generator that generate the reference signal based on by the clock signal,
    wherein, when the first correlation value is lower than the first threshold, the clock generator adjusts a frequency of the clock signal to adjust a frequency of the reference signal.

6. The acquisition apparatus according to claim 3, wherein the second phase-calculating section selects as an object of the correlating operation one of the reference signals, a maximum value in the first correlation values that are equal to or greater than the first threshold.

7. The acquisition apparatus according to claim 2, wherein the first correlator includes a plurality of first correlators;
   wherein the first comparator includes a plurality of first comparators each corresponding to the plurality of first correlators;
   wherein the second calculating section includes a search point selecting section that selects a phase realizing a maximum value in the first correlating values that are equal or greater than the first threshold; and
   wherein the second correlator calculates the second correlation value by the use of the reference signal having a phase that realize the maximum value.

8. The acquisition apparatus according to claim 3 further comprising a counter that counts number of the at least one of the plurality of first correlation values which is equal to or greater than the first threshold,
   wherein the threshold calculating section calculates the second threshold in accordance with the counted number, the first threshold and the at least one of the plurality of first correlation values.

* * * * *